United States Patent
Raninen

(10) Patent No.: US 12,388,685 B2
(45) Date of Patent: Aug. 12, 2025

(54) REGULARIZED INTERFERENCE-PLUS-NOISE COVARIANCE MATRIX ESTIMATION

(71) Applicant: Nokia Solutions and Networks Oy, Espoo (FI)

(72) Inventor: Elias Aksel Raninen, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 19/024,907

(22) Filed: Jan. 16, 2025

(65) Prior Publication Data
US 2025/0233779 A1  Jul. 17, 2025

(30) Foreign Application Priority Data
Jan. 17, 2024 (FI) ..................... 20245038

(51) Int. Cl.
*H04L 25/03* (2006.01)
*H04L 25/02* (2006.01)

(52) U.S. Cl.
CPC ...... *H04L 25/03006* (2013.01); *H04L 25/021* (2013.01); *H04L 25/0242* (2013.01)

(58) Field of Classification Search
CPC ............ H04L 25/03006; H04L 25/021; H04L 25/0242
USPC ................... 375/229–236, 346–350
See application file for complete search history.

(56) References Cited

U.S. PATENT DOCUMENTS

| | | | |
|---|---|---|---|
| 2008/0225934 A1* | 9/2008 | Mourad | H04L 25/0212 375/227 |
| 2008/0247446 A1* | 10/2008 | Kramer | H04B 17/345 375/267 |
| 2009/0010148 A1* | 1/2009 | Hara | H04B 7/0626 370/328 |
| 2015/0131758 A1* | 5/2015 | Chen | H04B 7/0456 375/340 |
| 2022/0217019 A1* | 7/2022 | Levinbrook | H04L 25/0224 |
| 2022/0286258 A1* | 9/2022 | Kuchi | H04B 7/024 |

FOREIGN PATENT DOCUMENTS

| | | |
|---|---|---|
| CN | 115967424 A | 4/2023 |
| EP | 4020832 A1 | 6/2022 |

OTHER PUBLICATIONS

Mailloux, "Covariance matrix augmentation to produce adaptive array pattern troughs", IEEE Antennas and Propagation Society International Symposium, Jun. 18-23, 1995, pp. 102-105.

(Continued)

Primary Examiner — Don N Vo
(74) Attorney, Agent, or Firm — Nokia Technologies Oy

(57) ABSTRACT

Apparatuses and methods in a communication system are disclosed. A signal is received. The signal comprises demodulation reference information. The apparatus compute estimates of the channel and of interference-plus-noise vectors. The interference-plus-noise vectors are used as input for choosing a tapering matrix and for determining shrinkage target matrix and parameter. An interference plus noise covariance matrix estimator is computed and used in an equalizer, which has as input an estimate of the interference-plus-noise covariance matrix.

18 Claims, 6 Drawing Sheets

(56) References Cited

OTHER PUBLICATIONS

Zatman et al., "Production of adaptive array troughs by dispersion synthesis", Electronics Letters, vol. 31, No. 25, Dec. 7, 1995, pp. 2141-2142.
Guerci et al., "Theory and application of covariance matrix tapers for robust adaptive beamforming", IEEE Transactions on Signal Processing, vol. 47, No. 4, Apr. 1999, pp. 977-985.
Ollila et al., "Regularized Tapered Sample Covariance Matrix", IEEE Transactions on Signal Processing, vol. 70, Apr. 26, 2022, pp. 2306-2320.
Chen et al., "Shrinkage algorithms for MMSE covariance estimation", IEEE Transactions on Signal Processing, vol. 58, No. 10, Oct. 2010, pp. 5016-5029.
Heath Jr. et al., "Foundations of MIMO Communication", Cambridge University Press, Dec. 2018, 803 pages.
Ollila et al., "Complex elliptically symmetric distributions: survey, new results and applications", IEEE Transactions on Signal Processing, vol. 60, No. 11, Nov. 2012, pp. 5597-5625.
Ollila et al., "Shrinking the eigenvalues of M-estimators of covariance matrix", IEEE Transactions on Signal Processing, vol. 69, Dec. 11, 2020, pp. 256-269.
Ledoit et al., "A well-conditioned estimator for large-dimensional covariance matrices", Journal of Multivariate Analysis, vol. 88, No. 2, Feb. 2004, pp. 365-411.
Mercer, "Divergent sequences satisfying the linear fractional transformations", International Journal of Mathematics and Mathematical Sciences, vol. 16 No. 2, 1993, pp. 297-299.
Senneret et al., "Covariance Versus Precision Matrix Estimation for Efficient Asset Allocation", IEEE Journal of Selected Topics in Signal Processing, vol. 10, No. 6, Sep. 2016, pp. 982-993.
Visuri et al., "Sign and rank covariance matrices", Journal of Statistical Planning and Inference, vol. 91, No. 2, Dec. 1, 2000, pp. 1-19.
Visuri et al., "Subspace-based direction-of-arrival estimation using nonparametric statistics", IEEE Transactions on Signal Processing, vol. 49, No. 9, Sep. 2001, pp. 2060-2073.
Mattsson et al., "Analysis of the Minimum-Norm Least-Squares Estimator and Its Double-Descent Behavior [Lecture Notes]", IEEE Signal Processing Magazine, vol. 40, No. 3, May 2023, pp. 39-75.
Chen et al., "Shrinkage-to-Tapering Estimation of Large Covariance Matrices", IEEE Transactions on Signal Processing, vol. 60, No. 11, Nov. 2012, pp. 5640-5656.
Office Action received for corresponding Finnish Patent Application No. 20245038, dated Jun. 6, 2024, 8 pages.
Raninen et al., "Coupled Regularized Sample Covariance Matrix Estimator for Multiple Classes", IEEE Transactions on Signal Processing, vol. 69, Oct. 7, 2021, pp. 5681-5692.

\* cited by examiner

REGULARIZED INTERFERENCE-PLUS-NOISE COVARIANCE MATRIX ESTIMATION

RELATED APPLICATION

This application claims benefit of priority from Finnish Patent App. No 20245038, filed Jan. 17, 2024, the disclosure of which is hereby incorporated in its entirety by reference herein.

FIELD

The exemplary and non-limiting embodiments of the invention relate generally to wireless communication systems. Embodiments of the invention relate especially to apparatuses and methods in wireless communication networks.

BACKGROUND

In wireless telecommunication systems terminal devices may have significant interferences with each other. Interferences experienced by the devices may originate from different sources. The interference may originate from the same cell (intra-cell interference) or neighbouring cells (inter-cell interference), and it can severely degrade the detection performance of the terminal devices if not taken into account in signal processing at the receiving end.

Wireless communication systems are in constant development. Methods that were applicable and useful earlier do not necessarily provide required results in future systems. In present and future wireless systems, the trend is to utilise multiple antennas in both transmission and reception of signals. This causes a need to develop new solutions for example to interference reduction procedures.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided apparatus in a communication system, comprising a processor; and a memory including instructions, the instructions, when executed by the processor, cause the apparatus to: control reception, with a number p of antennas, a signal comprising demodulation reference information; estimating n number of interference-plus-noise vectors of dimension p; computing, based on the estimated interference-plus-noise vectors, a sample covariance matrix S; determining a target matrix F based on the sample covariance matrix S and the identity matrix I; determining a set of tapering matrices $\{T_1, \ldots, T_K\}$, where K is the total number of tapering matrices considered; choosing a tapering matrix T from the set $\{T_1, \ldots, T_K\}$ that minimizes a cross-validation loss function, wherein the cross-validation loss for each $T_k$, k=1, ..., K, is computed by partitioning the estimated interference-plus-noise vectors into a given number of B folds, and, for each fold i=1, ..., B, calculating the squared Frobenius distance between an interference-plus-noise sample covariance matrix computed using only the estimated interference-plus-noise vectors in the current fold i and a tapered interference-plus-noise sample covariance matrix computed as the elementwise (Hadamard) product between $T_k$ and the interference-plus-noise sample covariance matrix computed using the remaining interference-plus-noise vectors in the B−1 other folds excluding fold i, and averaging over the B computed distances; determining the tapering matrix T using leave-one-out cross-validation as described above, where the given number of folds B equals to the number n of estimated interference-plus-noise vectors; determining a tapered interference-plus-noise sample covariance matrix as the elementwise (Hadamard) product of the interference-plus-noise sample covariance matrix S and the chosen tapering matrix T; determining an estimator $\hat{R}$ of the interference-plus-noise covariance matrix R as a convex combination with coefficient ρ of the tapered interference-plus-noise sample covariance matrix and the target matrix F; determining the value for the shrinkage parameter p as the minimizer of the estimated mean squared error between the interference-plus-noise covariance matrix R and the estimate $\hat{R}$ of the interference-plus-noise covariance matrix, where the shrinkage parameter p is restricted to be a real-valued number between 0 and 1 and applying the estimator $\hat{R}$ using the determined shrinkage parameter and the target matrix in the equalization of a data signal.

According to an aspect of the present invention, there is provided a method in an apparatus in a communication system comprising the steps of controlling reception, with a number p of antennas, a signal comprising demodulation reference information; estimating n number of interference-plus-noise vectors of dimension p; computing, based on the estimated interference-plus-noise vectors, a sample covariance matrix S; determining a target matrix F based on the sample covariance matrix S and the identity matrix I; determining a set of tapering matrices $\{T_1, \ldots, T_K\}$, where K is the total number of tapering matrices considered; choosing a tapering matrix T from the set $\{T_1, \ldots, T_K\}$ that minimizes a cross-validation loss function, wherein the cross-validation loss for each $T_k$, k=1, ..., K, is computed by partitioning the estimated interference-plus-noise vectors into a given number of B folds, and, for each fold i=1, ..., B, calculating the squared Frobenius distance between an interference-plus-noise sample covariance matrix computed using only the estimated interference-plus-noise vectors in the current fold i and a tapered interference-plus-noise sample covariance matrix computed as the elementwise (Hadamard) product between $T_k$ and the interference-plus-noise sample covariance matrix computed using the remaining interference-plus-noise vectors in the B−1 other folds excluding fold i, and averaging over the B computed distances; determining the tapering matrix T using leave-one-out cross-validation as described above, where the given number of folds B equals to the number n of estimated interference-plus-noise vectors; determining a tapered interference-plus-noise sample covariance matrix as the elementwise (Hadamard) product of the interference-plus-noise sample covariance matrix S and the chosen tapering matrix T; determining an estimator $\hat{R}$ of the interference-plus-noise covariance matrix R as a convex combination with coefficient ρ of the tapered interference-plus-noise sample covariance matrix and the target matrix F; determining the value for the shrinkage parameter p as the minimizer of the estimated mean squared error between the interference-plus-noise covariance matrix R and the estimate $\hat{R}$ of the interference-plus-noise covariance matrix, where the shrinkage parameter p is restricted to be a real-valued number between 0 and 1; and applying the estimator $\hat{R}$ using the determined shrinkage parameter and the target matrix in the equalization of a data signal.

In an embodiment, there is provided apparatus in a communication system, comprising means for controlling reception, with a number p of antennas, a signal comprising demodulation reference information; means for estimating n number of interference-plus-noise vectors of dimension p; means for computing, based on the estimated interference-plus-noise vectors, a sample covariance matrix S; means for determining a target matrix F based on the sample covariance matrix S and the identity matrix I; means for determining a set of tapering matrices $\{T_1, \ldots, T_K\}$, where K is the total number of tapering matrices considered; means for choosing a tapering matrix T from the set $\{T_1, \ldots, T_K\}$ that minimizes a cross-validation loss function, wherein the cross-validation loss for each $T_k$, k=1, ..., K, is computed by partitioning the estimated interference-plus-noise vectors into a given number of B folds, and, for each fold i=1, ..., B, calculating the squared Frobenius distance between an interference-plus-noise sample covariance matrix computed using only the estimated interference-plus-noise vectors in the current fold i and a tapered interference-plus-noise sample covariance matrix computed as the elementwise (Hadamard) product between $T_k$ and the interference-plus-noise sample covariance matrix computed using the remaining interference-plus-noise vectors in the B−1 other folds excluding fold i, and averaging over the B computed distances; means for determining the tapering matrix T using leave-one-out cross-validation as described above, where the given number of folds B equals to the number n of estimated interference-plus-noise vectors; means for determining a tapered interference-plus-noise sample covariance matrix as the elementwise (Hadamard) product of the interference-plus-noise sample covariance matrix S and the chosen tapering matrix T; means for determining an estimator $\hat{R}$ of the interference-plus-noise covariance matrix R as a convex combination with coefficient ρ of the tapered interference-plus-noise sample covariance matrix and the target matrix F; means for determining the value for the shrinkage parameter ρ as the minimizer of the estimated mean squared error between the interference-plus-noise covariance matrix R and the estimate $\hat{R}$ of the interference-plus-noise covariance matrix, where the shrinkage parameter ρ is restricted to be a real-valued number between 0 and 1; and means for applying the estimator $\hat{R}$ using the determined shrinkage parameter and the target matrix in the equalization of a data signal.

One or more examples of implementations are set forth in more detail in the accompanying drawings and the description below. Other features will be apparent from the description and drawings, and from the claims. The embodiments and/or examples and features, if any, described in this specification that do not fall under the scope of the independent claims are to be interpreted as examples useful for understanding various embodiments of the invention.

LIST OF DRAWINGS

Embodiments of the present invention are described below, by way of example only, with reference to the accompanying drawings, in which FIGS. 1 and 2 illustrate examples of simplified system architecture of a communication system;

DESCRIPTION OF SOME EMBODIMENTS

Figure 1:
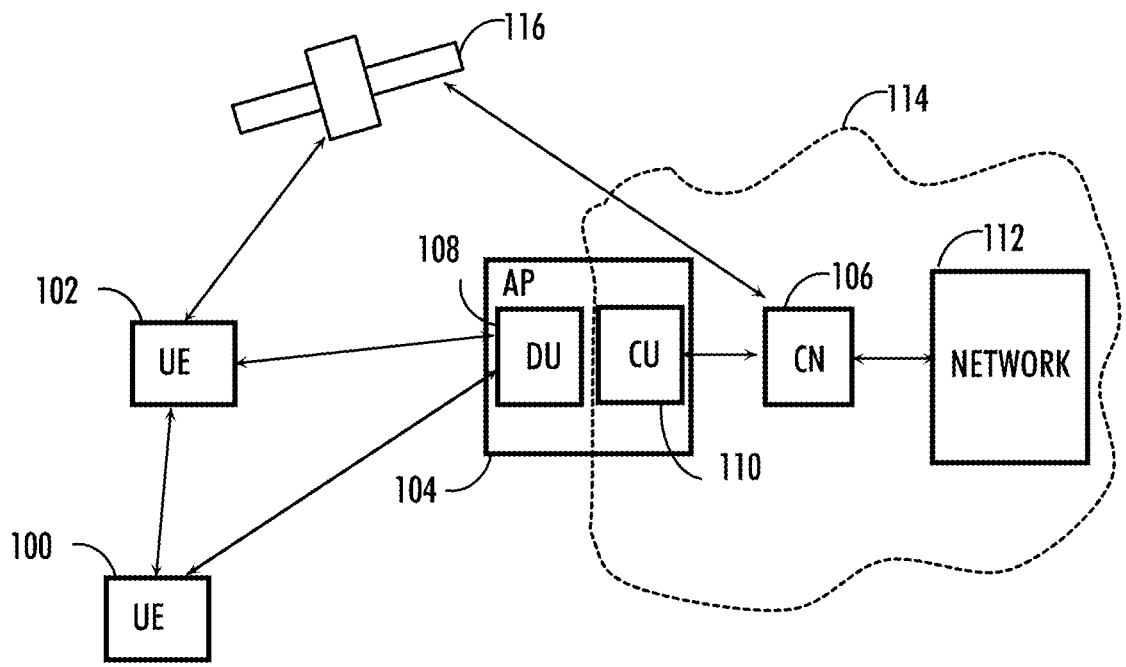

FIG. 1 shows devices 100 and 102. The devices 100 and 102 may, for example, be user devices or user terminals. The devices 100 and 102 are configured to be in a wireless connection on one or more communication channels with a node 104. The node 104 is further connected to a core network 106. In one example, the node 104 may be an access node, such as (e/g)NodeB, serving devices in a cell. In one example, the node 104 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 106 (CN or next generation core NGC).

The device (also called a subscriber unit, user device, user equipment (UE), user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (e.g. a portable or non-portable computing device) that includes wireless mobile communication devices operating with or without an universal subscriber identification module (USIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G or NR (New Radio) enables using multiple input-multiple output (MIMO) antennas, many more base stations or nodes than the Long Term Evolution, LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, e.g. below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, 6 or above 24 GHz-cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at or close to a remote antenna site (in a distributed unit, DU 108) and non-real time functions being carried out in a centralized manner (in a centralized unit, CU 110).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication 116 to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano) satellites are deployed). Each satellite in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home (e/g)NodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g) Node Bs, includes, in addition to Home (e/g)NodeBs (H(e/g)NodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
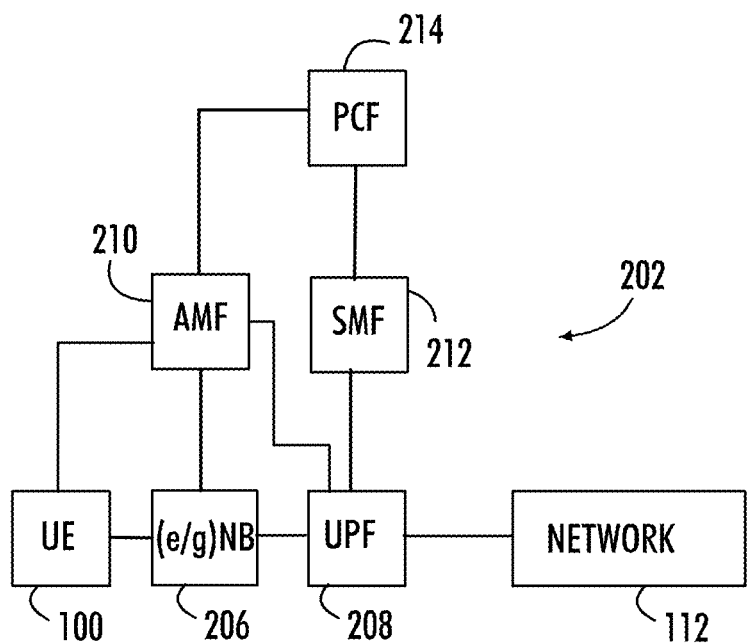

FIG. 2 illustrates an example of a communication system based on 5G network components. A user terminal or user equipment 100 communicating via a 5G network 202 with a data network 112. The user terminal 100 is connected to a Radio Access Network RAN node, such as (e/g)NodeB 206 which provides the user terminal a connection to the network 112 via one or more User Plane Functions 208. The user terminal 100 is further connected to Core Access and Mobility Management Function, AMF 210, which is a control plane core connector for (radio) access network and can be seen from this perspective as the 5G version of Mobility Management Entity, MME, in LTE. The 5G network further comprises Session Management Function, SMF 212, which is responsible for subscriber sessions, such as session establishment, modify and release, and a Policy Control Function 214 which is configured to govern network behavior by providing policy rules to control plane functions.

The (e/g)NodeB 206 may serve the terminal devices in its coverage are by utilising a beamforming technique, where it transmits signals to the terminal devices via one or more beams. The beams may have at least partly different coverage areas. In an embodiment, a terminal device may receive a signal via more than one beam. Typically, transmission on each beam comprises a beam index. Thus, the terminal device may know which beam it is receiving.

6G networks are expected to adopt flexible decentralized and/or distributed computing systems and architecture and ubiquitous computing, with local spectrum licensing, spectrum sharing, infrastructure sharing, and intelligent automated management underpinned by mobile edge computing, artificial intelligence, short-packet communication and blockchain technologies. Key features of 6G will include intelligent connected management and control functions, programmability, integrated sensing and communication, reduction of energy footprint, trustworthy infrastructure, scalability and affordability. In addition to these, 6G is also targeting new use cases covering the integration of localization and sensing capabilities into system definition to unifying user experience across physical and digital worlds.

in wireless systems communicating devices experience interference during communication. Interference may occur from various different sources. One source of interference experienced by a terminal device is the interference from other terminal devices, originating either from terminal devices in the same cell (intra-cell interference) or from terminal devices in neighboring cells (inter-cell interference). This interference should be taken into account in the detection of the desired signal of the terminal device, otherwise significant degrade the detection performance occurs.

Typically, a near minimum mean squared error, (LMMSE) equalizer is used in a wireless system receiver. In LMMSE equalizers, the sum of the interference and noise is often approximated as having a zero-mean circular complex Gaussian distribution (hereafter simply referred to as Gaussian distribution) with covariance matrix given by an interference-plus-noise covariance matrix (INCM). Even though the Gaussian model can serve as a workable approximation if there are enough independent interfering random signals, the interferences are generally non-Gaussian.

The performance of a LMMSE receiver significantly depends on the estimation accuracy of the INCM. In minimum mean squared error interference rejection combining (MMSE-IRC), receivers conventionally use a sample covariance matrix (SCM) of estimated interference-plus-noise sample vectors to estimate the INCM. As the number of unknown parameters in the INCM grows quadratically with the number of antennas, even more samples are required for its accurate estimation. This is the major drawback of using the SCM: its poor performance when the number of samples is small compared to the dimension, i.e., the number of receive antennas. In 6G multiple-input and multiple-output (MIMO) receivers, the number of antennas will likely increase multifold compared to current receivers, as increasing the number of antennas is an effective way of improving the spectral efficiency.

The interference-plus-noise sample vectors are usually obtained via demodulation reference signals (DMRS) that consume resources from the communication link. However, due to strict low-latency and high-mobility requirements, the number of samples cannot be limitlessly increased. Therefore, using the SCM to estimate the INCM may no longer be feasible. When the number of antennas is of the same order as the number of samples, the error of the SCM based MMSE-IRC grows very large. When the number of antennas is larger than the number of samples, the SCM is no longer positive definite, and the SCM based MMSE-IRC cannot anymore be computed.

Since the goal of MMSE-IRC receivers is also to suppress the received power from interfering signals, certain robustness against the presence of moving interferers or vibrating antennas is also desirable. Typically, interference in the data set used for estimating the INCM, e.g., demodulation reference signals (DMRS), differs from the interference in the data set, where the INCM is applied (e.g., data symbols). Thus, any discrepancy between the interference experienced in the DMRS and the data symbols causes a degradation in the performance of a receiver. This type of loss in performance can be mitigated by a method called covariance matrix tapering.

One known method for INCM estimation is a so called regularized tapered SCM (RTSCM). The RTSCM is a convex combination of a tapered SCM and a target matrix. Tapering of the SCM can be used to improve interference rejection via null broadening. This is useful, when the interference in the data set used for estimating the INCM, e.g., demodulation reference signals (DMRS), differs from the interference in the data set, where the INCM is applied (e.g., data symbols). This may be the case if the interferes are in movement.

On the other hand, shrinkage regularization of the SCM toward a structured target matrix can be used to reduce the mean squared error (MSE) of the SCM as well as guarantee positive-definiteness of the estimate. However, the performance of the known solutions can still be improved.

The proposed solution is a novel method for estimating the optimal parameters for a RTSCM. As an example, two different embodiments are disclosed for two variations of a RTSCM corresponding to two different target matrices: a spherical target matrix and a diagonal target matrix. Further, a method for choosing an appropriate tapering matrix is disclosed.

The proposed solution comprises a method for choosing both the shrinkage parameter and the tapering matrix in order to make the INCM estimate well-conditioned as well as robust to moving interferers, when the dimension of the antenna array is large compared to the available number of samples for INCM computation.

In an embodiment, a RTSCM is used for the estimation of the INCM in LMMSE equalization. The shrinkage parameters for the proposed RTSCM estimators may be chosen under the assumption of complex circular elliptically symmetric (CCES) distributed samples. This includes the complex Gaussian distribution as a special case. Further, a leave-one-out cross-validation (LOOCV) based method is proposed for choosing the tapering matrix out of a set of candidate matrices.

Figure 3:
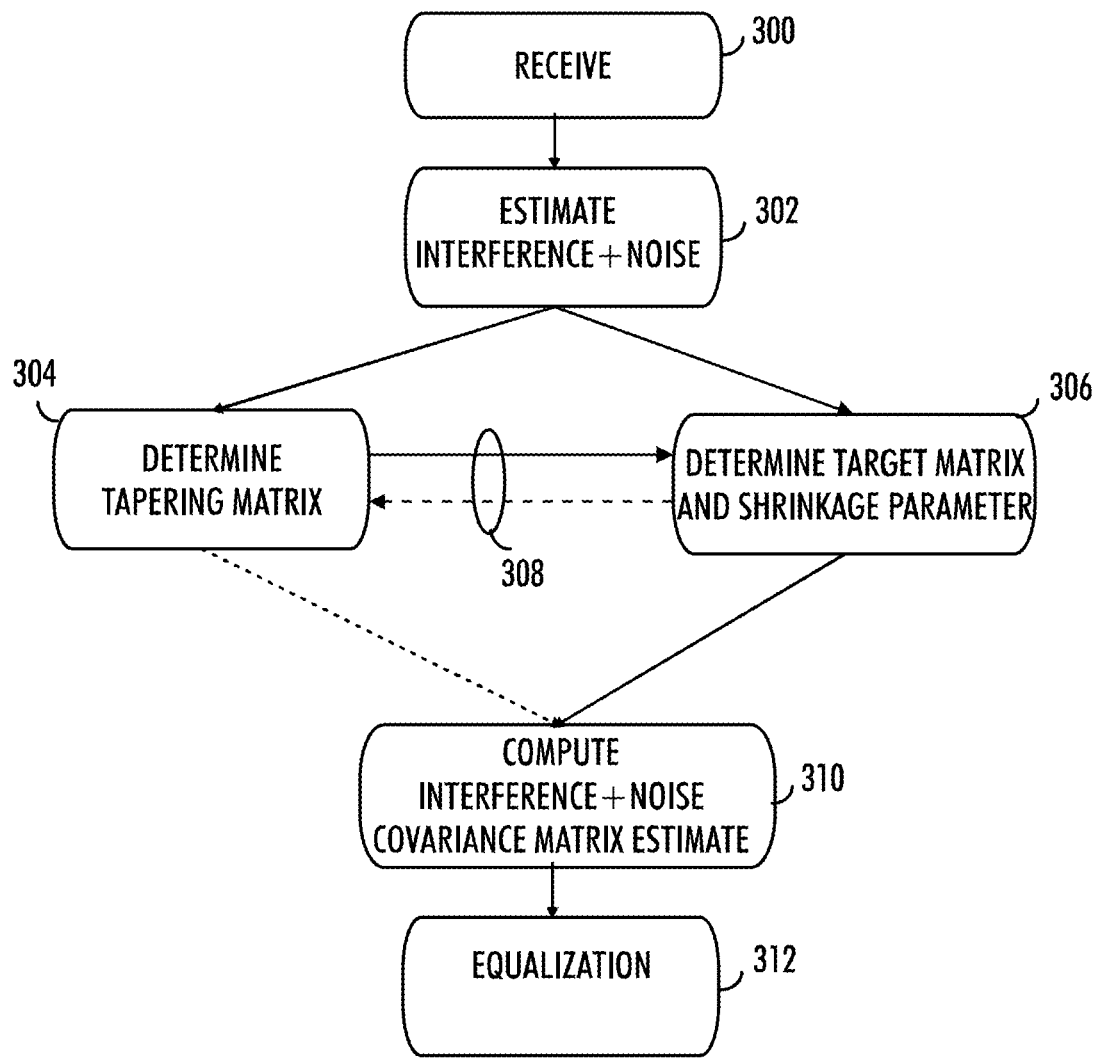
FIGS. 3 and 4 are flowcharts illustrating some embodiments.

FIG. 3 is a flow chart illustrating an embodiment in an apparatus.

A signal is received 300 with a given number of receiving antennas. The signal comprises demodulation reference information. For example, the signal may be a slot containing demodulation reference signals (pilots).

The apparatus is configured to compute 302 estimates of the channel between the transmitter and the receiving antennas and, furthermore, estimates of interference-plus-noise vectors. If, for example, OFDM transmission is utilized, the subsequent processing may be done on a resource block basis or on sets of resource blocks.

The interference-plus-noise vectors are used as input for choosing 304 the tapering matrix as well as for determining 306 the shrinkage target matrix and shrinkage parameter.

In an embodiment, the optimal shrinkage parameter depends 308 on the chosen target matrix, therefore the tapering matrix may be determined first. However, alternatively, it is also possible to take into account 308 the shrinkage parameter when determining the tapering matrix, or first choose the shrinkage parameter and then the tapering matrix.

When the tapering matrix and shrinkage parameter have been determined the interference plus noise covariance matrix estimator may be computed 310 and used in an equalizer 312, which needs as input an estimate of the interference-plus-noise covariance matrix.

Figure 4:
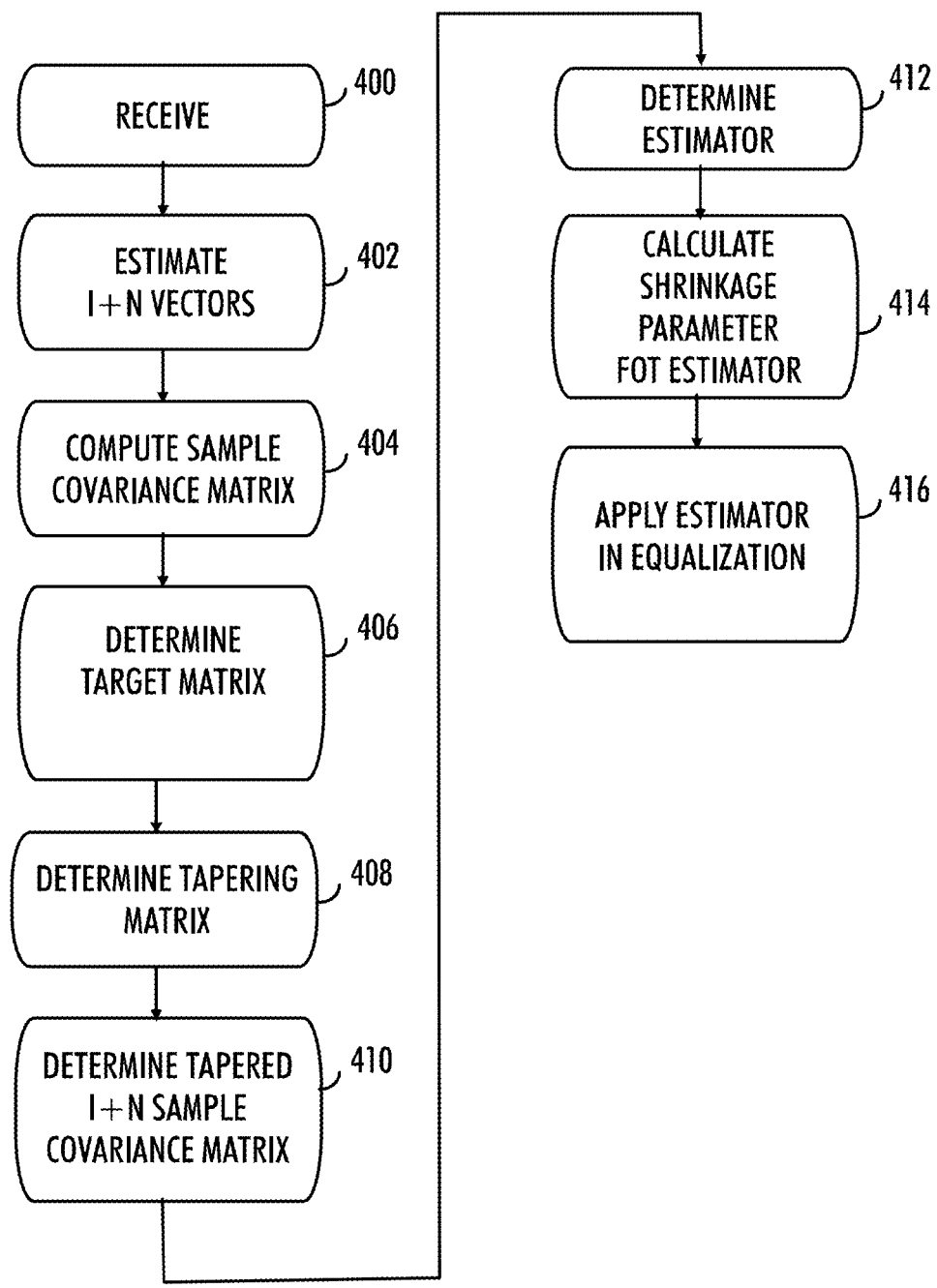

The flowchart of FIG. 4 illustrates an embodiment. The flowchart illustrates an example of an embodiment applied at a network element apparatus of a communication system. In an embodiment, the apparatus may be a (e/g)NodeB or an access point, or a part of a (e/g)NodeB or an access point, for example. In an embodiment, the apparatus may be a terminal device or a part of a terminal device.

The embodiment illustrates a solution for estimating the interference-plus-noise covariance matrix R at a multiantenna receiver in a wireless communications network, where given a set of n estimated interference-plus-noise vectors $\hat{d}_i$, i=1, . . . , n, of dimension p corresponding to the number of receive antennas in the apparatus.

In step 400, the apparatus is configured to control reception, with a number p of antennas, a signal comprising demodulation reference information.

In step 402, the apparatus is configured to estimate interference-plus-noise vectors $\hat{d}_i$ of dimension p.

In step 404, the apparatus is configured to compute, based on the interference-plus-noise vectors, a sample covariance matrix S.

In step 406, the apparatus is configured to determine a target matrix F based on the sample covariance matrix S and identity matrix I.

In an embodiment, the target matrix F is determined as an elementwise (Hadamard) product of the sample covariance matrix S and the identity matrix I.

In an embodiment, the target matrix F is determined as F=(Tr(S)/p)I, where Tr(·) denotes the matrix trace.

In step 408, the apparatus is configured to select a tapering matrix T from a set of known tapering matrices. The apparatus is configured to determine values of the tapering matrix T(r) by selecting such corresponding parameter $r \in \{r_k\}_{k=1, \ldots, K}$ that minimizes a cross-validation loss function, wherein the cross-validation loss function is determined by partitioning the interference-plus-noise vectors into a given number Bfolds.

Then, for each fold i=1, . . . , B, the apparatus is configured to calculate the squared Frobenius distance between a tapered interference-plus-noise sample covariance matrix computed using only the interference-plus-noise vectors of the particular fold i denoted be $S_i$ and the tapered interference-plus-noise sample covariance matrix with tapering parameter $r_k$ computed using the remaining interference-plus-noise vectors in the other folds except for current fold i under calculation denoted by $T(r_k) \circ S_{-i}$, and averaging over the B computed distances, yielding the cross-validation loss for $r_k$. Then, r is chosen as the $r_k$, which minimizes the cross-validation loss, that is the minimizer of $$L(r_k) = \frac{1}{B}\sum_{i=1}^{B} \|T(r_k) \circ S_{-i} - S_i\|_F^2.$$

Thus in an embodiment, B=n, which yields a leave-one-out cross-validation loss function, $$L(T(r_k)) = \frac{1}{n}\sum_{i=1}^{n} \|T(r_k) \circ S_{-i} - S_i\|_F^2.$$

In step 410, the apparatus is configured to compute a tapered interference-plus-noise sample covariance matrix by computing the elementwise product of the interference-plus-noise sample covariance matrix and the chosen tapering matrix.

In step 412, the apparatus is configured to determine an estimator $\hat{R}$ of the interference-plus-noise covariance matrix R as a convex combination with coefficient ρ of the tapered interference-plus-noise sample covariance matrix and the target matrix F;

In step 414, the apparatus is configured to calculate a value for the shrinkage parameter ρ as the minimizer of estimated mean squared error between the interference-plus-noise covariance matrix R and the estimate $\hat{R}$ of the interference-plus-noise covariance matrix under the constraint that ρ is a real-valued number between 0 and 1.

In an embodiment, the expectations in the mean squared error can be evaluated by assuming that the interference-plus-noise vectors are independently and identically distributed random vectors from a circular complex-valued elliptically symmetric distribution.

The shrinkage parameter ρ may be given by the stationary point of the mean squared error (since the mean squared error is convex in ρ) and it can be found by equating the derivative of the mean squared error with respect to ρ with zero and solving for ρ.

In an embodiment, the unknown terms depending on the interference-plus-noise covariance matrix R can be estimated as follows. As proposed in Y. Chen et al., 'Shrinkage algorithms for MMSE covariance estimation', IEEE Trans. Signal Process., vol. 58, no. 10, pp. 5016-5029, October 2010, doi: 10.1109/TSP.2010.2053029, the unknown terms $\text{Tr}(R)$ and $\text{Tr}(R^2)$ may be estimated using $\text{Tr}(\hat{R})$ and $\text{Tr}(\hat{R}S)$, respectively. Furthermore, $\text{Tr}((A \circ R)^2)$, for some matrix A, may be estimated using $\text{Tr}((A \circ \hat{R})(A \circ S))$ as in Chen et. al., 'Shrinkage-to-Tapering Estimation of Large Covariance Matrices', IEEE Trans. Signal Process., vol. 60, no. 11, pp. 5640-5656, November 2012, doi: 10.1109/TSP.2012.2210546.

In an embodiment, for the Gaussian assumption, the elliptical kurtosis parameter is set to zero ($\kappa=0$), otherwise, the elliptical kurtosis can be estimated as the average sample elliptical kurtosis of the variables of the interference-plus-noise vectors.

In an embodiment, the resulting equation for the shrinkage parameter $\rho$ may be identified as having the form of a fixed point of a linear fractional equation, i.e., $$\rho = \frac{a\rho + b}{c\rho + d} \Leftrightarrow c\rho^2 + (d-a)\rho - b = 0,$$

with real-valued coefficients a, b, c and d. The fixed-point equation can be rewritten as a quadratic equation, whose roots can be solved, and of whose smallest root is chosen as the final shrinkage parameter $\rho$ subject to the constraint that it is a real-valued number between 0 and 1.

In step 416, the apparatus is configured to apply the determined shrinkage parameter and the target matrix in the equalization of a data signal.

In an embodiment, the set of known tapering matrices may be selected so that for each tapering matrix the element in row i and column j is given by $$(T(r))_{ij} = \beta + (1-\beta)\text{sinc}(|i-j|r/\pi)$$

where $\beta \in [\beta_{min}, 1]$, and $\beta_{min}$ is such that every element of $T(r)$ is non-negative.

In some other embodiments, the set of tapering matrices can be chosen by some other function of r, which yield a set of positive semidefinite matrices.

In an embodiment, as the determination of the shrinkage parameter does not depend on the scaling of the interference-plus-noise covariance matrix, in the estimation of the shrinkage parameter p, a statistically robust spatial sample sign covariance (SSCM) may also be used, which is a sample covariance matrix computed from unit normalized interference-plus-noise vectors. In this case, the unknown terms depending on $\text{Tr}(R)$ may be estimated using $\text{Tr}(\hat{R}_{sgn})$ and the second-order terms $\text{Tr}(R^2)$ and $\text{Tr}((A \circ R)^2)$ may be estimated using $\text{Tr}(\hat{R}_{sgn}S_{sgn})$ and $\text{Tr}((A \circ \hat{R}_{sgn})(A \circ S_{sgn}))$, respectively, where $S_{sgn}$ is the SSCM and $\hat{R}_{sgn} = (1-\rho)(T \circ S_{sgn}) + \rho F_{sgn}$ and $F_{sgn} = I \circ S_{sgn}$ or $$F_{sgn} = \left(\frac{\text{Tr}(S_{sgn})}{p}\right) I.$$

Once the shrinkage parameter is found the interference-plus-noise covariance matrix estimate is given by $R = (1-\rho)(T \circ S) + \rho F$.

The embodiments of the present invention provide many advantages over prior art solution. The apparatuses applying the embodiments outperform baseline receivers including the regularized sample covariance matrix (SCM) based minimum mean squared error interference rejection combining receiver.

Further, the proposed solution avoids the significant error of the regularized SCM based MMSE-IRC receiver, when the number of samples and the number of antennas are of similar size. Assuming complex circular elliptically symmetric (CCES) distributed data allows for deviations from the Gaussian noise and interference assumptions. In addition, the solution is computationally efficient.

Let us further discuss some embodiments in detail.

Minimum mean squared error (MMSE) interference rejection combining (IRC), MMSE-IRC, is a method which may be utilized combining antenna input signals in the presence of interference coming from other users. Let us consider the signal model $$y = Hx + v + n \in \mathbb{C}^p,$$

where y is received data, $H \in \mathbb{C}^{p \times L}$ is a channel matrix, $x \in \mathbb{C}^L$ is transmitted data, $v \in \mathbb{C}^p$ is interference from other users, and $n \in \mathbb{C}^p$ is zero-mean complex (circular) Gaussian noise with covariance $N_0 I$ [6]. In general, interference is Gaussian. However, if the number of interfering users is large enough, it is possible to use the following known model:

$$y = Hx + d \in \mathbb{C}^p,$$

where $d = v + n$ is complex (circular) Gaussian with covariance matrix $R_d = E[vv^H] + N_0 I$. The term $R_d$ may be referred as the interference-plus-noise covariance matrix.

The LMMSE estimator of x may be defined as the minimizer of the expectation $E[\|x - W^H y\|_F^2]$ with respect to W, yielding the LMMSE weight matrix $W = R_y^{-1} R_{yx}$, where $R_{yx} = E[yx^H]$ and $R_y = E[yy^H]$.

Using this model, and assuming $R_x = E[xx^H] = I$, the linear MMSE-IRC estimate $\hat{x}$ of x is given by $\hat{x} = W_{IRC}^H y$, where $$W_{IRC} = (R_d + HH^H)^{-1} H.$$

If we assume that there is no interference, but only white noise, that is, $R_d = N_0 I$, we then have the conventional MMSE estimate and the associated weight matrix is given by $$W_{MMSE} = (N_0 I + HH^H)^{-1} H.$$

If the interference and noise are completely ignored, we obtain the zero-forcing weight matrix $W_{ZF} = H^\dagger$, where $H^\dagger$ denotes the Moore-Penrose pseudo-inverse of H.

In the following, a tapering and shrinkage covariance matrix estimation method is proposed for estimating the interference-plus-noise covariance matrix $R_d$.

Complex circular elliptically symmetric (CCES) distributions comprise a family of distributions that generalize the circular complex Gaussian to also include heavier-tailed distributions, for instance, the complex multivariate Student's t-distribution. In the following derivations, let us consider a p-dimensional zero-mean CCES distributed random variable $d \in \mathbb{C}^p$. The probability distribution function (pdf) the random variable $d \in \mathbb{C}^p$ has the form $$f(d) = C_{p,g} |\Sigma|^{-1} g(d^H \Sigma^{-1} d)$$

where the function $g: [0, \infty] \to [0, \infty]$ is called the density generator. Here, $\Sigma$ is a $p \times p$ positive definite Hermitian scatter matrix parameter, and $C_{p,g}$ is a normalizing constant. We denote this case as $d \in \mathbb{C}E_p(0, \Sigma, g)$. The density generator g defines the particular elliptical distribution. For instance, if d has the circular complex Gaussian distribution, then g(t)=exp(−t), and we may write d∼ $\mathbb{C}N_p(0,\Sigma)$. We assume that second order moments of d exists, and hence, the scatter matrix is up to a scaling constant equal to the covariance matrix $E[dd^H]$. Therefore, here g may be defined so that we have $\Sigma=E[dd^H]$. Furthermore, we assume finite fourth order moments and define the elliptical kurtosis as $$\kappa = \frac{1}{2}kurt(d_i),$$

where $d_i$ is any element of the (zero-mean) random vector $d=(d_i)$, and $$(d_i) = \frac{E[|d_i|^4]}{E[|d_i|^2]^2} - 2.$$

In the above case where d∼ $\mathbb{C}N_p(0,\Sigma)$, we have κ=0. The kurtosis parameter has the theoretical lower bound κ≥−1/(p+1).

Consider n independent and identically distributed (i.i.d.) samples $d_i \sim \mathbb{C}E_p(0,\Sigma,g)$, i=1, . . . , n. A conventional unbiased estimator of the covariance matrix is given by the sample covariance matrix (SCM)

$$s = (1/n)\sum_{i=1}^{n} d_i d_i^H,$$

which is the maximum likelihood estimate of $\Sigma$ under the Gaussian assumption, i.e., if $d_i \sim \mathbb{C}N_p(0,\Sigma)$. Although, we consider the centered case, we note that in the non-centered case, one can use the unbiased sample covariance matrix $$s = (1/(n-1))\sum_{i=1}^{n} (d_i - \bar{d})(d_i - \bar{d})^H,$$

where $$\bar{d} = (1/n)\sum_{i=1}^{n} d_i$$

is the sample mean, which will result in slightly different values for $\tau_1$ and $\tau_2$ in what follows.

Let us review some results regarding the SCM. It may be shown that $$E[Tr(S)^2]=\tau_1 Tr(\Sigma^2)+(1+\tau_2)Tr(\Sigma)^2,$$

where $\tau_1=(1+\kappa)/n$ and $\tau_2=\kappa/n$ for centered (zero-mean) CCES distributions. Additionally, for a real-valued symmetric p×p matrix A, we have $$E[Tr((A\circ S)^2)]=(1+\tau_2)Tr((A\circ \Sigma)^2)+\tau_1 Tr(((I\circ \Sigma)A)^2).$$

A special case is when A=I, as then we have $$E[Tr((I\circ S)^2)]=(1+\tau_1+\tau_2)Tr((I\circ \Sigma)^2)$$

Let us next study shrinkage covariance estimation.

When the dimension p is large compared to the sample size n, the SCM has a lot of error due to its large variance. A common strategy to reduce the mean squared error (MSE) of the SCM is to use regularization of the form:

$$\hat{\Sigma}(\rho)=(1-\rho)S+\rho F,$$

where $\rho \in [0,1]$ is a shrinkage parameter and F is a target matrix, usually taken $$F = \frac{Tr(S)}{p}I.$$

Generally, the target matrix is biased, but has a much smaller variance than the SCM. The goal of shrinkage estimation is to reduce the total MSE via optimally trading off between the variance of S and the bias introduced by F by controlling the shrinkage intensity via the shrinkage parameter ρ. More specifically, the goal is to find an optimal value ρ* that minimizes the MSE of $\hat{\Sigma}(\varphi)$, that is $$\rho^*=\arg\min_\rho E[\|\hat{\Sigma}(\rho)-\Sigma\|_F^2]=\arg\min_\rho \{E[\|\hat{\Sigma}(\rho)-E[\hat{\Sigma}(\rho)]\|_F^2]+\|\Sigma-E[(\rho)]\|\}$$

where on the right-hand side, the first term corresponds to the variance of the estimator and the second term corresponds to the squared bias of the estimator.

Another form of regularization is covariance matrix tapering. In array processing, tapering can be used for null broadening in beamforming. A tapered SCM estimator may be expressed in the form $$\hat{\Sigma}(\rho)=T\circ S,$$

where ∘ denotes the elementwise (Hadamard) product, and the matrix $T=(t_{ij})$ is a weighting or tapering matrix. In an embodiment, the elements of the matrix are restricted to satisfy $0 \leq t_{ij}=t_{ji} \leq 1$, $t_{ii}=1$. It may be noted that the shrinkage estimator above can also be formulated via choosing $T(\rho)=(1-\rho)11^T+\rho F \circ S^{\circ -1}$, where $S^{\circ -1}=(s_{ij}^{-1})$. In this case $T(\rho)\circ S=(1-\rho)S+\rho F$.

Let us next discuss theoretically optimal shrinkage parameter.

Here, a combination of the shrinkage and tapering formulations are used. A regularized tapered sample covariance matrix estimator may be formed as $$\hat{\Sigma}(\rho)=(1-\rho)(T\circ S)+\rho F,$$

where the shrinkage parameter $\rho \in [0,1]$, the target matrix is either $F=(Tr(S)/p)I$ or $F=I\circ S$, and the matrix $T=(t_{ij})$ is a tapering matrix satisfying $0 \leq t_{ij}=t_{ji} \leq 1$, $t_{ii}=1$.

In an embodiment, the optimal shrinkage parameter may be derived as follows. The MSE of the estimator may be written as $$E[\|\hat{\Sigma}(\rho)-\Sigma\|_F^2]=E[\|(T\circ S-\Sigma)-\rho(T\circ S-F)\|_F^2]=\rho^2 E[\|T\circ S-F\|_F^2]-2\rho E[Tr((T\circ S-F)(T\circ S-\Sigma))]+C,$$

where $C=E[\|T\circ S-\Sigma\|_F^2]$ does not depend on p. The MSE is convex in ρ. Hence, by setting its derivative with respect to p equal to zero, it follows that the optimal shrinkage parameter is given by $$\rho^* = \frac{E[Tr((T\circ S - F)(T\circ S - \Sigma))]}{E[\|T\circ S - F\|_F^2]}.$$

By expanding the numerator, we have $$E[Tr((T\circ S)^2)]-E[Tr((T\circ S)F)]+E[Tr(\Sigma F)]-E[Tr((T\circ S)E)].$$

Likewise, by expanding, the denominator, we have $$E[Tr((T\circ S)^2)]-2E[Tr((T\circ S)F)]+E[Tr(F^2)].$$

Let us define $$\alpha_1 = E[Tr((T \circ S)^2)]$$

$$\alpha_2 = E[Tr((T \circ S)F)] = E[Tr((V \circ S)(V \circ F))]$$

$$\alpha_3 = E[Tr(\Sigma F)]$$

$$\alpha_4 = E[Tr((T \circ S)E)] = Tr((V \circ E)^2)$$

$$\alpha_5 = E[Tr(F^2)].$$

Here, the matrix $V = T^{\circ 1/2}$, that is the element-wise square-root of T. We can then rewrite the optimal shrinkage parameter as $$\rho^* = \frac{\alpha_1 + \alpha_2 + \alpha_3 - \alpha_4}{\alpha_1 - 2\alpha_2 + \alpha_5}.$$

Note that $\alpha_1$ and $\alpha_4$ do not depend on the target matrix F. For CCES distributions applies $$\alpha_1 = E[Tr((T \circ S)^2)] = (1+\tau_2)Tr((T \circ E)^2) + \tau_1 Tr(((I \circ E)T)^2),$$

where $\tau_1 = (1+\kappa)/n$ and $\tau_2 = \kappa/n$ for centered (zero-mean) CCES distributions.

Let us next discuss how to obtain estimates of the optimal shrinkage parameters.

First, in an embodiment, it may be noted that the coefficients $\alpha_i$, $1 \leq i \leq 5$, depend on the unknown covariance matrix E. Therefore, the coefficients need to be estimated. Here it is proposed to estimate the unknown terms using the covariance matrix estimator itself, which will result in a fixed-point equation formulation. More specifically, in the equation for the optimal shrinkage parameter, first order terms $Tr(\Sigma)$ will be estimated using $Tr(\hat{\Sigma}(\rho))$ and second order terms $Tr(\Sigma^2)$ will be estimated using the product $Tr(\hat{\Sigma}(\rho)S)$. Terms of the form $Tr((A \circ \Sigma)^2)$, where A is a fixed matrix will be estimated by $Tr((A \circ \hat{\Sigma}(\rho))(A \circ S))$. Via this approach, it may be obtained, after some calculations, the following estimates $\hat{\alpha}_i$ of $\alpha_i$, $1 \leq i \leq 5$:

$$\hat{\alpha}_1 = \rho a_1 + b_1, \text{ where}$$

$$a_1 = (1+\tau_2)[Tr((T \circ F)(T \circ S)) - Tr((V \circ T \circ S)^2)] + \tau_1[Tr(FT(I \circ S)T) - Tr(((I \circ S)T)]^2$$

$$b = \tau_1 Tr(((I \circ S)T)^2) + (1+\tau_2)Tr((V \circ T \circ S)^2)$$

$$\hat{\alpha}_4 = \rho a_4 + b_4, \text{ where}$$

$$a_4 = Tr((V \circ F)(V \circ S)) - Tr((V \circ T \circ S)(V \circ S)),$$

$$b_4 = Tr((V \circ T \circ S)(V \circ S)).$$

Recall the notation $V = T^{\circ 1/2}$. The coefficients $\alpha_2$, $\alpha_3$, and, $\alpha_5$ depend on the chosen target matrix F. Let us next investigate the cases separately for the two considered target matrices: the spherical target $F = (Tr(S)/p)I$ and the diagonal target $F = I \circ S$.

For the spherical target:
For $F = (Tr(S)/p)I$, we have $$\hat{\alpha}_2 = \rho a_2 + b_2, \text{ where}$$

$$a_2 = \tau_1 Tr(S)^2/p^2 - \tau_1 Tr((T \circ S)S)/p \text{ and}$$

$$b_2 = \tau_1 Tr((T \circ S)S)/p + (1+\tau_2)Tr(S)^2/p.$$

The third coefficient is $$\hat{\alpha}_3 = b_3, \text{ where}$$

$$b_3 = Tr(S)^2/p.$$

Lastly, $$\hat{\alpha}_5 = \hat{\alpha}_2.$$

This results in the following equation for the shrinkage parameter for the spherical target:

$$\rho = \frac{\hat{\alpha}_1 + \hat{\alpha}_2 + \hat{\alpha}_3 - \hat{\alpha}_4}{\hat{\alpha}_1 - \hat{\alpha}_2} = \frac{(a_1 - a_2 - a_4)\rho + b_1 - b_2 + b_3 - b_4}{(a_1 + a_2)\rho + b_1 - b_2},$$

which we identify as describing a fixed point of a linear fraction equation.
For the diagonal target:
For $F = I \circ S$, we have $$\hat{\alpha}_2 = b_2, \text{ where}$$

$$b_2 = (1 + \tau_1 + \tau_2)Tr((I \circ S)^2),$$

$$\hat{\alpha}_3 = b_3, \text{ where}$$

$$b_3 = Tr((I \circ S)^2).$$

Lastly, $$\hat{\alpha}_5 = \hat{\alpha}_2.$$

This results in the following equation for the shrinkage parameter for the diagonal target:

$$\rho = \frac{\hat{\alpha}_1 + \hat{\alpha}_2 + \hat{\alpha}_3 - \hat{\alpha}_4}{\hat{\alpha}_1 - \hat{\alpha}_2} = \frac{(a_1 - a_4)\rho + b_1 - b_2 + b_3 - b_4}{a_1 \rho + b_1 - b_2},$$

which we identify as describing a fixed point of a linear fraction equation.

Next, let us study solving the shrinkage parameter.
Recall that the estimate for the optimal shrinkage parameter is given by a fixed point of a linear fractional equation (or Möbius transformation). Hence, we describe the general solution for coefficients a, b, c, and d, satisfying ad−bc≠0 and c≠0, and whose values for the particular problem the reader can identify from above. Solving the fixed-point equation of a linear fractional equation can be transformed to solving a quadratic equation as $$\rho = \frac{a\rho + b}{c\rho + d} \Leftrightarrow c\rho^2 + (d - a)\rho - b = 0.$$

The solution is thereby given as $\rho = (a - d \pm \sqrt{D})/(2c)$, where $D = (a-d)^2 + 4bc = (a+d)^2 - 4(ad-bc)$. In general, there is either one real solution (for D=0), two real solutions (for D>0), or two complex solutions (for D<0), which are conjugate to each other. The solution naturally depends on the tapering matrix T, which should be chosen such that we obtain a feasible solution. With most practical tapering matrices, we obtain two solutions (D>0), of which we choose the smaller one given that it satisfies $\rho \in [0, 1]$.

Next, let us study the non-tapered embodiment.
In the non-tapered case, where $T = 11^T$, we obtain simple formulas for the estimate of the optimal shrinkage parameter. Namely, we have $a_4 = b_3 - b_4$ and the discriminant D can then also be simplified.

Deriving the shrinkage parameter estimate for the spherical target is as follows.

In the spherical case the discriminant simplifies to $D=(a_1-a_2-a_4-(b_1-b_2))_2+4(b_1-b_2+a_4)(a_1-a_2)=(a_1-a_2+a_4+b_1-b_2)^2$.
We thus have $$\rho = \frac{a_1 - a_2 - a_4 - (b_1 - b_2) \pm (a_1 - a_2 + a_4 + b_1 - b_2)}{2(a_1 - a_2)} = \begin{cases} \rho_+ = 1 \\ \rho_- = \frac{-a_4 - b_1 + b_2}{a_1 - a_2} \end{cases}.$$

Here $\rho_+$ does not depend on the data. Regarding $\rho_-$, we have $a_1 = (1+\tau_2)(Tr(S)^2/p - Tr(S^2))$ $a_2 = \tau_1 Tr(S)^2/p^2 - \tau_1 Tr(S^2)/p$ $a_4 = Tr(S)^2 - Tr(S^2)$ $b_1 = \tau_1 Tr(S)^2 + (1+\tau_2)Tr(S)^2/p$ $b_2 = \tau_1 Tr(S^2)/p + (1+\tau_2)Tr(S)^2/p$.

We used the fact that for $T = 11^T$, we have $Tr(((I \circ S)T)^2) Tr(FT(I \circ S)T) = Tr(S)^2$. Defining $\gamma_S = pTr(S^2)/Tr(S)^2$, it is then straightforward to show that $$\rho_- = \frac{(\tau_2 - \tau_1/p)\gamma_S + \tau_1 p - \tau_2}{(1 + \tau_2 - \tau_1/p)(\gamma_S - 1)}.$$

In the complex Gaussian case, we have $\tau_1 = 1/n$ and $\tau_2 = 0$, and so, we obtain $$\rho_- = \frac{p - \gamma_S/p}{(n - 1/p)(\gamma_S - 1)} = \frac{Tr(S)^2 - Tr(S^2)/p}{(n - 1/p)(Tr(S^2) - Tr(S)^2/p)}.$$

Above we see that $\rho_- > 0$ since $1 < \gamma_S \leq p$. Therefore, we may take $\rho = \min\{\rho_-, 1\}$.

Deriving the shrinkage parameter estimate for the diagonal target is as follows.

In the diagonal case the discriminant simplifies to $D=(a_1-a_4-(b_1-b_2))^2+4(b_1-b_2+a_4)a_1=(a_1+a_4+b_1-b_2)^2$.

$$\rho = \frac{a_1 - a_4 - (b_1 - b_2) \pm (a_1 + a_4 + b_1 - b_2)}{2a_1} = \begin{cases} \rho_+ = 1 \\ \rho_- = \frac{-a_4 - b_1 + b_2}{a_1 - a_2} \end{cases}.$$

We have $a_1(1+\tau_2)(Tr((I \circ S)^2) - Tr(S^2))$ $a_4 = Tr((I \circ S)^2) - Tr(S^2)$ $b_1 = \tau_1 Tr(S)^2 + (1+\tau_2)Tr(S^2)$ $b_2 = (1+\tau_1+\tau_2)Tr((I \circ S)^2)$.

Then, $\rho_- =$ $$\frac{\tau_2 Tr(S^2) + \tau_1 Tr(S)^2 - (\tau_1 + \tau_2)Tr((I \circ S)^2)}{(1 + \tau_2)(Tr(S^2) - Tr((I \circ S)^2))} = \frac{\tau_2 \gamma_S + \tau_1 p - (\tau_1 + \tau_2)\gamma_I}{(1 + \tau_2)(\gamma_S - \gamma_I)},$$

where $\gamma_I = pTr((I \circ S)^2)/Tr(S)^2$. In the complex Gaussian case, we again have $\tau_1 = 1/n$ and $\tau_2 \times 0$, and thus $$\rho_- = \frac{Tr(S)^2 - Tr((I \circ S)^2)}{n(Tr(S^2) - Tr((I \circ S)^2))}.$$

Above we see that $\rho_- > 0$. Therefore, we may take $\rho = \min\{\rho_-, 1\}$.

The shrinkage parameter estimates above are computed using the sample covariance matrix SCM. It may be noted however, that the shrinkage parameter estimates do not depend on the scale of the SCM. Therefore, using S or $\tilde{S} = cS$, $c > 0$, will yield the same estimated $\rho$. For a more robust estimate of the shrinkage parameters, one can use the sample spatial sign covariance matrix (SSCM) defined for samples $d_i$, $i = 1, \ldots, n$, as $$s_{sgn} = \frac{1}{n}\sum_{i=1}^{n}\frac{d_i d_i^H}{\|d_i\|^2}.$$

In this case, all the instances of S in the computation of the shrinkage parameter are replaced by $S_{sgn}$.

Next, choosing a tapering matrix is discussed next, given a set of candidate matrices $\{T(r)\}$ parametrized by $r \in \{r_k\}$, e.g., by forming a grid of values $\{r_1, \ldots, r_K\}$. A leave-one-out cross-validation (LOOCV) procedure is proposed to choose the tapering matrix. There are three options.

1. (Taper first) First a tapering matrix is chosen by minimizing the error of $T(r) \circ S$ with respect to r and obtaining $\hat{r}^*$. Then with a fixed $T(\hat{r}^*)$, the shrinkage parameter is chosen for $\hat{\Sigma}(\rho) = (1 - \varphi(T(\hat{r}^*) \circ S) + \rho F$, using the proposed method above.

2. (Taper after) First the shrinkage parameter is computed for the non-tapered estimator $\hat{\Sigma}(\rho) = (1 - \varphi S + \rho F$, and afterwards the tapering matrix is chosen using a fixed p. This can be done by first noting that $T(r) \circ F = F$, since the off-diagonals of F are zero. The following identity $T(r) \circ \hat{E}(\rho) = (1 - \rho)(T(r) \circ S) + \rho F = \tilde{T}(r) \circ S$ may be used, where $\tilde{T}(r) = (1 - \rho)T(r) + \rho F \circ (I \circ S)^{-1}$. If the target matrix is $F = I \circ S$, then $\tilde{T}(r)$ satisfies $0 \leq \tilde{t}_{ij} = \tilde{t}_{ji} < 1$, $\tilde{t}_{ii} = 1$. For the spherical target, $F = p^{-1}Tr(S)I$, this is not the case. However, this is not a problem as the LOOCV procedure does not depend on this property.

3. (Taper) The optimal shrinkage parameter is computed for each candidate $T(r)$ in the cross-validation procedure using the proposed method.

Let us next derive the LOOCV method for choosing the tapering matrix. First, we introduce some notation. Let $$m_i = d_i \circ d_i^* \text{ and } S_m = \frac{1}{n}\sum_{i=1}^{n}m_i m_i^H.$$

Then let $$S_i = d_i d_i^H \text{ and } S_{-i} = \frac{1}{n-1}(nS - S_i),$$

i.e., the SCM computed without the sample $d_i$. The LOOCV error is defined as $$L(T(r)) = \frac{1}{n}\sum_{i=1}^{n}\|T(r)\circ S_{-i} - S_i\|_F^2.$$

It can be shown with straightforward calculations that $L(T(r))=A(r)+B-2C(r)$, where $$A(r) = \frac{n}{(n-1)^2}\left((n-2)Tr((T(r)\circ S)^2) + \frac{Tr(S_m T(r)^{\circ 2})}{n}\right),$$

$$B = \frac{1}{n}\sum_{i=1}^{n}\|d_i\|^4,$$

$$C(r) = \frac{n}{n-1}Tr((T(r)\circ S)S) - \frac{1}{n-1}Tr(S_m T(r)).$$

The parameter r is then chosen by minimizing $L(T(r))$, which is equivalent to $$\hat{r}^* = \arg\min_{r\in\{r_1,\ldots,r_K\}} A(r) - 2C(r),$$

since B does not depend on r.

The performance of the proposed method has been verified by simulations.

The MSE of the MMSE-IRC equalizer has been simulated using different estimators of the INCM and different number of antennas (dimensions) while keeping the number of (interference-plus-noise) samples fixed. An uplink scenario has been used, where the terminal device sends two streams of data in an uncorrelated Rayleigh fading channel and there is one interferer in line-of-sight. More specifically, the simulation setup was as follows.

For each Monte Carlo trial, we considered $n_{train}=24$ training samples (e.g., DMRS) of received data $y_i^{train}$ from which the INCM was estimated. The obtained INCM estimate was used in LMMSE equalization using $n_{test}=100$ test samples and the MSE performance was calculated. We averaged the simulation results over 500 Monte Carlo runs for each tested dimension p (number of antennas). For each Monte Carlo run, the training data, $y_i^{train}$, i=1, ..., $n_{train}$, was generated as follows:

$$y_i^{train}=Hx_i^{train}+w_i^{train}+v_i^{train}\in\mathbb{C}^p,$$

where the columns of $H\in\mathbb{C}^{p\times L}$, where L=2 is the number of streams, are given by $h_j\sim\mathbb{C}N(0,2I)$ for $j\in\{1, 2\}$ (i.e., uncorrelated Rayleigh fading), $x_i^{train}\in\mathbb{C}^L$ contains uniformly random 4-QAM symbols with unit average power, $w_i^{train}\sim\mathbb{C}N(0,N_0 I)$, where $N_0=1$, contains additive white noise, and the interference is given by $v_i^{train}=z_i a(\theta_i)$, where $z_i\sim\mathbb{C}N(0,4)$ where $\theta_i=10$ for each i=1, ..., $n_{train}$, and $$a(\theta)=(1, e^{-i\pi\sin(\theta)}, e^{-i2\pi\sin(\theta)}, \ldots, e^{-i(p-1)\pi\sin(\theta)})^T.$$

The steering vector $a(\theta)$ corresponds to a uniform linear array (ULA) with half-wavelength interelement spacing. The channel estimate was modeled by $\hat{H}=H+E$, where the estimation error E had complex Gaussian entries with variance 0.1, i.e., $\mathbb{C}N(0, 0.1)$.

From the training data, estimates for the interference-plus-noise vectors were obtained via computing $$\hat{d}_i = y_i^{train} - \hat{H}x_i^{train},$$

which were then used for estimating the INCM using different methods. The SCM based estimate of the INCM $R_d$ is given by $$S_d = \frac{1}{n}\sum_{i=1}^{n}\hat{d}_i\hat{d}_i^H.$$

The test data, $y_i^{test}$, i=1, ..., $n_{test}$, was used for evaluating the performance of the different INCM estimators in equalization and it was generated as $$y_i^{test}=Hx_i^{test}+w_i^{test}+v_i^{test}\in\mathbb{C}^p$$

where $x_i^{test}\in\mathbb{C}^L$ contained uniformly random 16-QAM symbols with unit average power, the noise vector $w_i^{test}$ was similarly distributed as in the training data and the channel matrix H was unchanged. Regarding the interference term $v_i^{test}=z_i a(\theta_i)$, two different cases were considered:

a) $\theta_i=10$ deg, i.e., the same interferer angle as in the training data.
b) $\theta_i=\text{Unif}(10,12)$ deg, i.e., the interferer angle is uniformly distributed between 10 and 12 degrees in the test data. This scenario models the discrepancy between the interference in the DMRS and the data symbols in the case of a moving interferer.

The baseline methods ZF, MMSE, regularized SCM based MMSE-IRC, and the Tabasco estimator (from E. Ollila and A. Breloy, 'Regularized Tapered Sample Covariance Matrix', IEEE Trans. Signal Process., vol. 70, pp. 2306-2320, 2022) were compared to the proposed methods. The ZF symbol estimates were computed via $\hat{x}_i^{test}=\hat{H}^\dagger y_i^{test}$. Regarding the other methods, the symbol estimates were obtained via $$\hat{x}_i^{test}=\hat{H}^H(\hat{R}_d+\hat{H}\hat{H}^H)^{-1}y_i^{test},$$

and they only differed in the way the INCM was estimated. The MMSE method used $\hat{R}_d=\widehat{N_0}I$ and the noise variance estimate $\widehat{N_0}=p^{-1}Tr(S_d)I$. The regularized SCM based MMSE-IRC method used $\hat{R}_d=0.999\cdot S_d+0.001\cdot p^{-1}Tr(S_d)I$. Here, the small amount of regularization toward the identity structure was needed to guarantee invertibility when the dimension p was larger than the number of training samples $n_{train}$.

The proposed shrinkage methods and the Tabasco method applied tapering and shrinkage as $\hat{R}_d=(1-\rho)(T(r)\circ S_d)+\rho(Tr(S_d)/p)I$. We used the same structure of the tapering matrix $T(r)=(t_{ij})$ for the proposed methods and the Tabasco estimator. Namely, $t_{ij}=(1+\text{sinc}(|i-j|r/\pi))/2$, which satisfies $0\le t_{ij}=t_{ji}\le 1$, $t_{ii}=1$. This structure is slightly modified from the more common Mailloux-Zatman tapering structure given by $t_{ij}=\text{sinc}(|i-j|r/\pi)$, which has desirable null broadening properties (J. R. Guerci, 'Theory and application of covariance matrix tapers for robust adaptive beamforming', IEEE Trans. Signal Process., vol. 47, no. 4, pp. 977-985, April 1999, doi: 10.1109/78.752596 and references cited therein). For the proposed methods and the Tabasco method, the tapering matrix was data adaptively chosen from the set $\{T(r)\}$, where $r\in\{0, \ldots, 0.4\}$ consisted of 41 equally spaced points. For the proposed estimators, we made the Gaussian assumption (thus set $\kappa=0$) and used the SSCM for estimating the shrinkage parameter more robustly. For the Tabasco estimator, we also used the Gaussian assumption ($\kappa=0$) and used the more robust EII-estimator for estimating the sphericity statistics, which is also based on the SSCM.

Figure 5:
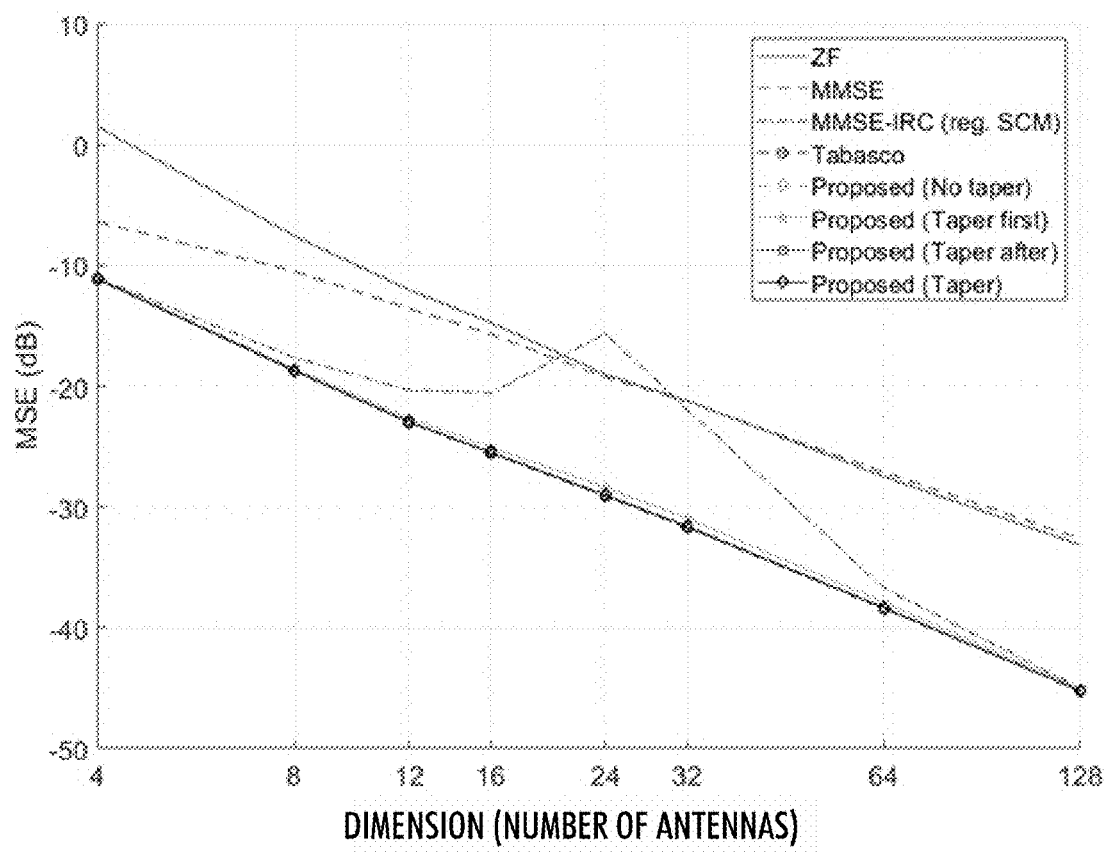
FIGS. 5 and 6 illustrate simulation results of the proposed solution.

FIG. 5 illustrates the empirical MSE of the LMMSE equalization for different INCM estimators in case a), when the interference was similar in the training and test sets.

It may be observed that the regularized SCM based MMSE-IRC gave significant improvement over zero-forcing (ZF) and MMSE. However, when the number of samples was of similar size to the dimension, the error of the regularized SCM based MMSE-IRC was very large. The peak of the error was obtained for $p \approx n_{train}$. This phenomenon is likely related to a double descent behavior of minimum-norm least squares estimators. The shrinkage-based methods, that is, the proposed methods as well as the Tabasco method had similar performance and clearly outperformed the conventional methods: ZF, MMSE and the regularized SCM based MMSE-IRC.

Figure 6:
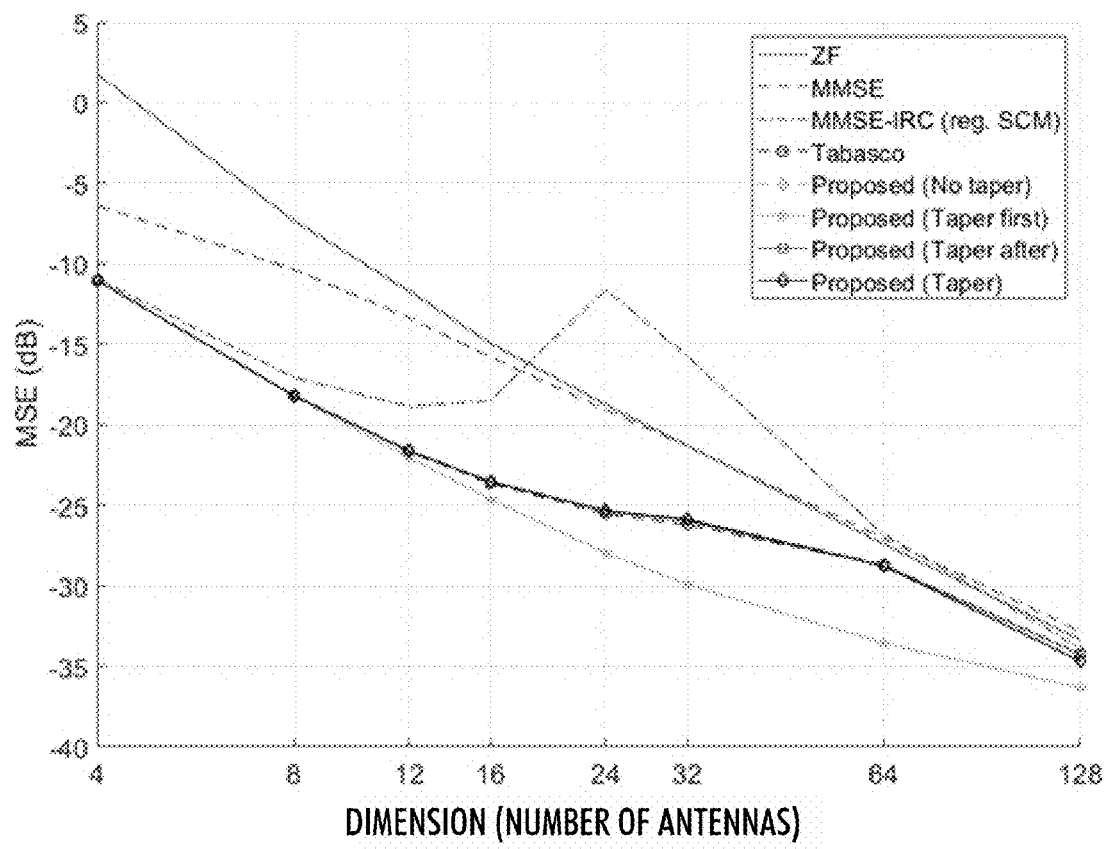

FIG. 6 illustrates the MSE of the LMMSE symbol estimates for the case b), when the interference was slightly different in the training and test data sets. Similarly, as in case a), the shrinkage-based estimators outperformed the baselines: ZF, MMSE, and the regularized SCM based MMSE-IRC. The regularized SCM based MMSE-IRC again had a large error at $p \approx n_{train}$. Most notably, the proposed Taper first method had the best performance from p=8 onwards.

For both cases, depicted in FIGS. 5 and 6, the empirical MSE was computed as $$\frac{1}{M}\sum_{m=1}^{M} \frac{1}{n_{test} \cdot L} \sum_{i=1}^{n_{test}} \left\| \hat{x}_{i,m}^{test} - x_{i,m}^{test} \right\|^2,$$

where M=500 is the number of Monte Carlo trials and $x_{i,m}^{test}$ and $\hat{x}_{i,m}^{test}$ are the true and estimated symbols of Monte Carlo trial m.

Figure 7A:
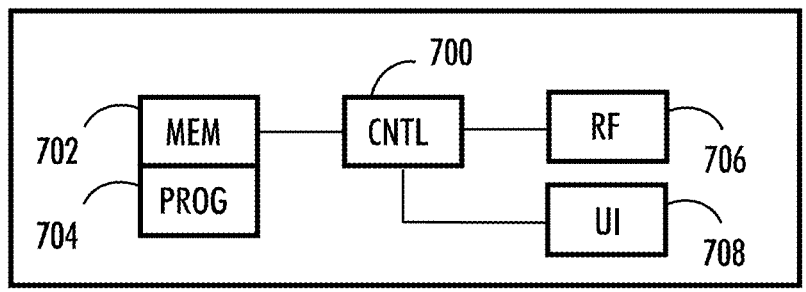
FIGS. 7A, 7B and 7C illustrate simplified examples of apparatuses applying some embodiments of the invention.
Figure 7B:
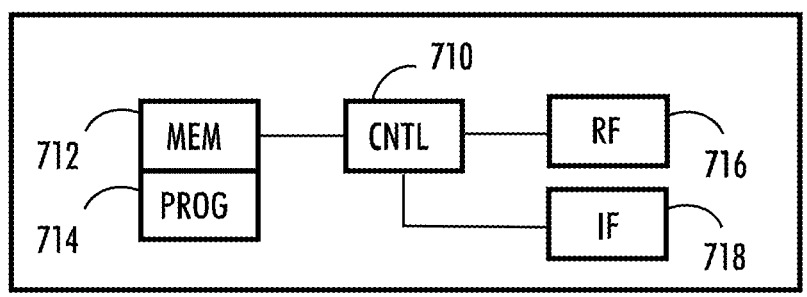
Figure 7C:
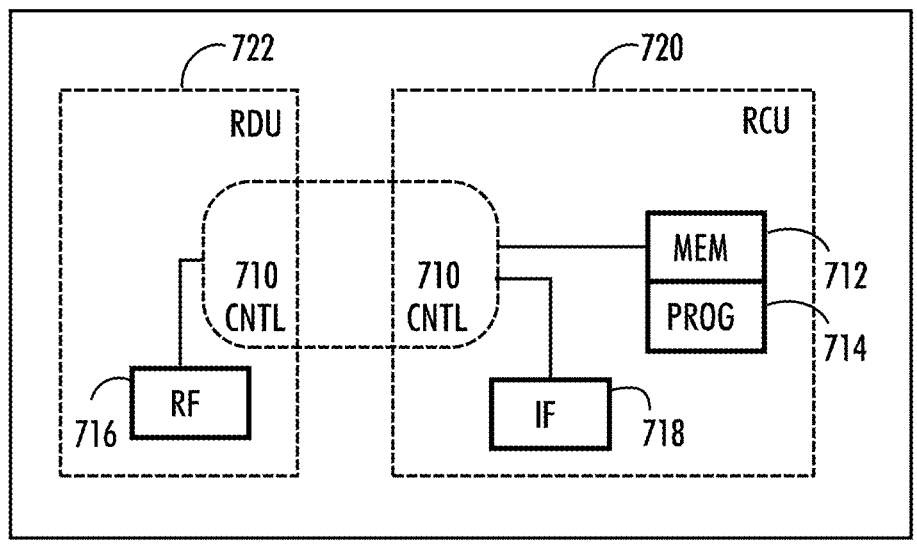

FIGS. 7A, 7B and 7C illustrate embodiments. The figures illustrate simplified examples of apparatuses applying embodiments of the invention. It should be understood that the apparatuses are depicted herein as examples illustrating some embodiments. It is apparent to a person skilled in the art that the apparatuses may also comprise other functions and/or structures and not all described functions and structures are required. Although the apparatuses have been depicted as one entity, different modules and memory may be implemented in one or more physical or logical entities.

FIG. 7A illustrates an example of an apparatus which may be a terminal device or a part of a terminal device.

The apparatus of the example includes a control circuitry 700 configured to control at least part of the operation of the apparatus.

The apparatus may comprise a memory 702 for storing data. Furthermore, the memory may store software 704 executable by the control circuitry 700. The memory may be integrated in the control circuitry.

The apparatus may comprise one or more interface circuitries 706, 708. The interface circuitries are operationally connected to the control circuitry 700. An interface circuitry 706 may be a set of transceivers configured to communicate wirelessly with terminal devices or user equipment of a wireless communication network. The interface circuitry may be connected to an antenna arrangement (not shown). The apparatus may also comprise a connection to a transmitter instead of a transceiver. The apparatus may further comprise a user interface 708.

In an embodiment, the software 704 may comprise a computer program comprising program code means adapted to cause the control circuitry 700 of the apparatus to realise at least some of the embodiments described above.

FIG. 7B illustrates an example of an apparatus which may be a base station, (e/g)NodeB or a part of base station or (e/g)NodeB.

The apparatus of the example includes a control circuitry 710 configured to control at least part of the operation of the apparatus.

The apparatus may comprise a memory 712 for storing data. Furthermore, the memory may store software 714 executable by the control circuitry 710. The memory may be integrated in the control circuitry.

The apparatus may comprise one or more interface circuitries 716, 718. The interface circuitries are operationally connected to the control circuitry 710. An interface circuitry 716 may be a set of transceivers configured to communicate wirelessly with terminal devices or user equipment of a wireless communication network. The interface circuitry may be connected to an antenna arrangement (not shown). The apparatus may also comprise a connection to a transmitter instead of a transceiver. The apparatus may further comprise an interface 718 configured to communicate with other network elements such a core network or other corresponding apparatuses, for example a user interface.

In an embodiment, the software 714 may comprise a computer program comprising program code means adapted to cause the control circuitry 710 of the apparatus to realise at least some of the embodiments described above.

In an embodiment, as shown in FIG. 7C, at least some of the functionalities of the apparatus of FIG. 7BA may be shared between two physically separate devices, forming one operational entity. Therefore, the apparatus may be seen to depict the operational entity comprising one or more physically separated devices for executing at least some of the described processes. Thus, the apparatus of FIG. 7C, utilizing such shared architecture, may comprise a remote control unit RCU 720, such as a host computer or a server computer, operatively coupled (e.g. via a wireless or wired network) to a remote distributed unit RDU 722 located in the (e/g)NodeB. In an embodiment, at least some of the described processes may be performed by the RCU 720. In an embodiment, the execution of at least some of the described processes may be shared among the RDU 722 and the RCU 720.

In an embodiment, the RCU 720 may generate a virtual network through which the RCU 720 communicates with the RDU 722. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (e.g. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RDU and the RCU. In practice, any digital signal processing task may be performed in either the RDU or the RCU and the boundary where the responsibility is shifted between the RDU and the RCU may be selected according to implementation.

In an embodiment, as shown in FIG. 7C, at least some of the functionalities of the apparatus of FIG. 7B may be shared between two physically separate devices, forming one operational entity.

The baseband parts of the apparatus may be located in a baseband unit 720 and radio frequency units may be located in a remote radio head RRH 722 which may be located near the antennas the apparatus uses in transmission.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, processing system or a circuitry which may comprise a working memory (random access memory, RAM), a central processing unit (CPU), and a system clock. The CPU may comprise a set of registers, an arithmetic logic unit, and a controller. The processing system, controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst several computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus in a communication system, comprising:
a processor; and a memory including instructions, the instructions, when executed by the processor, cause the apparatus to:
control reception, with a number p of antennas, a signal comprising demodulation reference information;
estimating n number of interference-plus-noise vectors of dimension p;
computing, based on the estimated interference-plus-noise vectors, a sample covariance matrix S;
determining a target matrix F based on the sample covariance matrix S and the identity matrix I;
determining a set of tapering matrices $\{T_1, \ldots, T_K\}$, where K is the total number of tapering matrices considered;
choosing a tapering matrix T from the set $\{T_1, \ldots, T_K\}$ that minimizes a cross-validation loss function, wherein the cross-validation loss for each $T_k$, k=1, ..., K, is computed by partitioning the estimated interference-plus-noise vectors into a given number of B folds, and, for each fold i=1, ..., B, calculating the squared Frobenius distance between an interference-plus-noise sample covariance matrix computed using only the estimated interference-plus-noise vectors in the current fold i and a tapered interference-plus-noise sample covariance matrix computed as the elementwise (Hadamard) product between $T_k$ and the interference-plus-noise sample covariance matrix computed using the remaining interference-plus-noise vectors in the B−1 other folds excluding fold i, and averaging over the B computed distances;
determining the tapering matrix T using leave-one-out cross-validation as described above, where the given number of folds B equals to the number n of estimated interference-plus-noise vectors;
determining a tapered interference-plus-noise sample covariance matrix as the elementwise (Hadamard) product of the interference-plus-noise sample covariance matrix S and the chosen tapering matrix T;
determining an estimator $\hat{R}$ of the interference-plus-noise covariance matrix R as a convex combination with coefficient $\rho$ of the tapered interference-plus-noise sample covariance matrix and the target matrix F;
determining the value for the shrinkage parameter $\rho$ as the minimizer of the estimated mean squared error between the interference-plus-noise covariance matrix R and the estimate $\hat{R}$ of the interference-plus-noise covariance matrix, where the shrinkage parameter $\rho$ is restricted to be a real-valued number between 0 and 1;

applying the estimator $\hat{R}$ using the determined shrinkage parameter and the target matrix in the equalization of a data signal.

2. The apparatus of claim 1, the memory and the computer program code configured to, with the processor, cause the apparatus further to:
selecting a set of known tapering matrices so that for each tapering matrix $T_k=T(r_k)$, k=1, . . . , K, the element in row i and column j is given by $(T(r_k))_{ij}=\beta-+(1-\beta)\text{sinc}(|i-j|r_k/\pi)$ where $\beta \in [\beta_{min}, 1]$, and $\beta_{min}$ is such that every element of $T(r_k)$ is non-negative.

3. The apparatus of claim 1, the memory and the computer program code configured to, with the processor, cause the apparatus further to:
determine the shrinkage parameter prior to the tapering matrix by defining the set of tapering matrices so that the resulting tapered interference-plus-noise sample covariance matrix has the form of a regularized tapered sample covariance matrix.

4. The apparatus of claim 1, the memory and the computer program code configured to, with the processor, cause the apparatus further to:
determining the tapering matrix and shrinkage parameter jointly by defining the set of tapering matrices so that the resulting tapered interference-plus-noise sample covariance matrix has the form of a regularized tapered sample covariance matrix, and where the shrinkage parameter is chosen separately for each candidate tapering matrix as the minimizer of estimated mean squared error.

5. The apparatus of claim 1, the memory and the computer program code configured to, with the processor, cause the apparatus further to:
applying the obtained interference-plus-noise covariance matrix estimate $\hat{R}$ as a plug-in estimator for the interference-plus-noise covariance matrix R in linear minimum mean squared error equalization when receiving a data signal.

6. The apparatus of claim 5, the memory and the computer program code configured to, with the processor, cause the apparatus further to:
estimating linear minimum mean squared error weight matrix $W=(R+HH^H)^{-1}H$ using $\hat{W}=(\hat{R}+HH^H)^{-1}H$, where H is the channel matrix or an estimate thereof, and the estimates $\hat{x}$ of transmitted data symbols x are obtained by multiplying the signal y received from the antennas by the weight matrix $\hat{W}$ as $\hat{x}=\hat{W}^H y$, where $(\cdot)^H$ denotes Hermitian transpose.

7. The apparatus of claim 1, the memory and the computer program code configured to, with the processor, cause the apparatus further to: determine a target matrix F as an elementwise (Hadamard) product of the sample covariance matrix S and the identity matrix I.

8. The apparatus of claim 1, the memory and the computer program code configured to, with the processor, cause the apparatus further to: determine a target matrix F as $F=(\text{Tr}(S)/p)I$.

9. The apparatus of claim 1, wherein the apparatus is one of a terminal device, a base station, an (e/g)NodeB.

10. A method in an apparatus in a communication system comprising the steps of:
controlling reception, with a number p of antennas, a signal comprising demodulation reference information;
estimating n number of interference-plus-noise vectors of dimension p;
computing, based on the estimated interference-plus-noise vectors, a sample covariance matrix S;
determining a target matrix F based on the sample covariance matrix S and the identity matrix I;
determining a set of tapering matrices $\{T_1, \ldots, T_K\}$, where K is the total number of tapering matrices considered;
choosing a tapering matrix T from the set $\{T_1, \ldots, T_K\}$ that minimizes a cross-validation loss function, wherein the cross-validation loss for each $T_k$, k=1, . . . , K, is computed by partitioning the estimated interference-plus-noise vectors into a given number of B folds, and, for each fold i=1, . . . , B, calculating the squared Frobenius distance between an interference-plus-noise sample covariance matrix computed using only the estimated interference-plus-noise vectors in the current fold i and a tapered interference-plus-noise sample covariance matrix computed as the elementwise (Hadamard) product between $T_k$ and the interference-plus-noise sample covariance matrix computed using the remaining interference-plus-noise vectors in the B−1 other folds excluding fold i, and averaging over the B computed distances;
determining the tapering matrix T using leave-one-out cross-validation as described above, where the given number of folds B equals to the number n of estimated interference-plus-noise vectors;
determining a tapered interference-plus-noise sample covariance matrix as the elementwise (Hadamard) product of the interference-plus-noise sample covariance matrix S and the chosen tapering matrix T;
determining an estimator $\hat{R}$ of the interference-plus-noise covariance matrix R as a convex combination with coefficient ρ of the tapered interference-plus-noise sample covariance matrix and the target matrix F;
determining the value for the shrinkage parameter ρ as the minimizer of the estimated mean squared error between the interference-plus-noise covariance matrix R and the estimate $\hat{R}$ of the interference-plus-noise covariance matrix, where the shrinkage parameter ρ is restricted to be a real-valued number between 0 and 1;
applying the estimator $\hat{R}$ using the determined shrinkage parameter and the target matrix in the equalization of a data signal.

11. The method of claim 10, further comprising:
selecting a set of known tapering matrices so that for each tapering matrix $T_k=T(r_k)$, k=1, . . . , K, the element in row i and column j is given by $(T(r_k))_{ij}=\beta-+(1-\beta)\text{sinc}(|i-j|r_k/\pi)$ where $\beta \in [\beta_{min}, 1]$, and $\beta_{min}$ is such that every element of $T(r_k)$ is non-negative.

12. The method of claim 10, further comprising:
determine the shrinkage parameter prior to the tapering matrix by defining the set of tapering matrices so that the resulting tapered interference-plus-noise sample covariance matrix has the form of a regularized tapered sample covariance matrix.

13. The method of claim 10, further comprising:
determining the tapering matrix and shrinkage parameter jointly by defining the set of tapering matrices so that the resulting tapered interference-plus-noise sample covariance matrix has the form of a regularized tapered sample covariance matrix, and where the shrinkage parameter is chosen separately for each candidate tapering matrix as the minimizer of estimated mean squared error.

14. The method of claim 10, further comprising:
applying the obtained interference-plus-noise covariance matrix estimate $\hat{R}$ as a plug-in estimator for the interference-plus-noise covariance matrix R in linear minimum mean squared error equalization when receiving a data signal.

15. The method of claim 14, further comprising:
estimating linear minimum mean squared error weight matrix $W=(R+HH^H)^{-1}H$ using $\hat{W}=(\hat{R}+HH^H)^{-1}H$, where H is the channel matrix or an estimate thereof, and the estimates $\hat{x}$ of transmitted data symbols x are obtained by multiplying the signal y received from the antennas by the weight matrix $\hat{W}$ as $x=\hat{W}^H y$, where $(\cdot)^H$ denotes Hermitian transpose.

16. The method of claim 10, further comprising: determining a target matrix F as an elementwise (Hadamard) product of the sample covariance matrix S and the identity matrix I.

17. The method of claim 10, further comprising: determining a target matrix F as $F=(Tr(S)/p)I$.

18. A computer program comprising instructions, which, when executed by an apparatus, cause the apparatus to perform the method of any of claim 10.

\* \* \* \* \*